T. E. McCOLLUM.
DRAFT DEVICE FOR TRACTORS AND THE LIKE.
APPLICATION FILED JULY 18, 1921.

1,408,107.

Patented Feb. 28, 1922.

INVENTOR
Thomas E. McCollum
By Lithurstonhaughs Co
attys.

UNITED STATES PATENT OFFICE.

THOMAS EDWARD McCOLLUM, OF WINONA, ONTARIO, CANADA.

DRAFT DEVICE FOR TRACTORS AND THE LIKE.

1,408,107.  Specification of Letters Patent.  Patented Feb. 28, 1922.

Application filed July 18, 1921. Serial No. 485,665.

*To all whom it may concern:*

Be it known that I, THOMAS EDWARD McCOLLUM, a subject of the King of Great Britain, and a resident of the village of Winona, in the county of Wentworth, Province of Ontario, Dominion of Canada, have invented certain new and useful Improvements in Draft Devices for Tractors and the like, of which the following is a specification.

My invention relates to improvements in draft devices for tractors and the object of the invention is to devise an improved manner of connecting the draft implements to a tractor whereby a more uniform and efficient distribution of the pull upon the tractor, due to these draft implements, is obtained, thus enabling the tractor at all times to travel in a straight path; a further object is to increase the tractive effort of the front wheels of the tractor; a further object is to facilitate the operation of plowing close up to trees and similar objects; and a still further object is to prevent the front wheels from lifting clear off the ground thus reducing the likelihood of the tractor turning turtle backwards and causing serious accidents.

My invention consists essentially of a pair of draw bar rods extending obliquely of the tractor and having their front ends connected to the tractor frame at each side thereof and above the front axle, said rods passing rearwardly under the rear axle and crossing each other intermediately of the tractor, hangers carried by the rear axle and freely supporting the draw bar rods and a cross bar at the rear of the tractor, the rear ends of the draw bar rods secured to said cross bar at each side thereof and the cross bar provided with a series of orifices for connecting the draft implements, all as hereinafter more particularly described and illustrated in the accompanying drawings in which;

Like characters of reference indicate corresponding parts in the different views.

Figure 1:
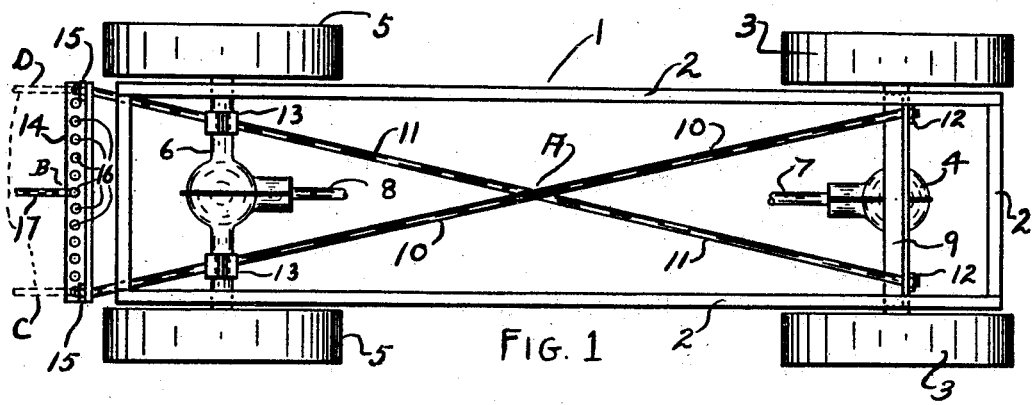
Fig. 1 is a diagrammatic plan view of a tractor, including the frame and the front and rear drive wheels, and showing my invention applied thereto.
Figure 2:
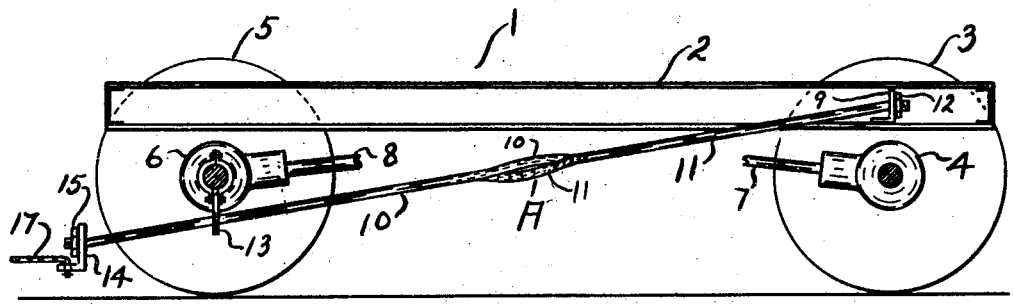
Fig. 2 is a side elevation of Fig. 1 with the near wheels and near side member of the frame removed.
Figures 3, 4, 5:
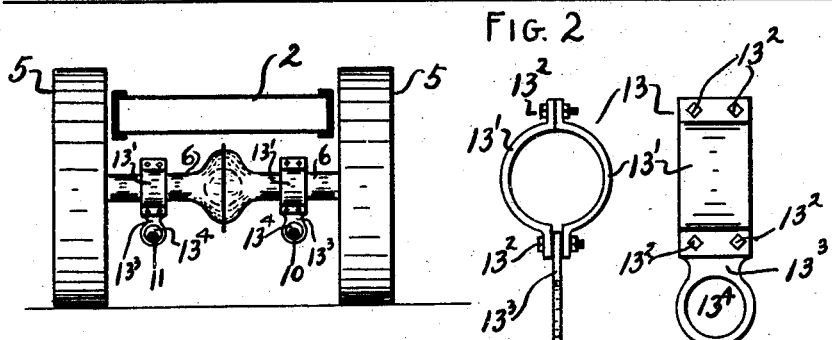
Fig. 3 is a rear view showing the manner of supporting the draw bar rods in hangers below the rear axle.
Fig. 4 is a side view of the hanger assembly shown detached from the rear axle.
Fig. 5 is an end view of Fig. 4.

1 indicates any tractor having the frame 2, the front drive wheels 3 carried by the live front axle 4 and the rear drive wheels 5 carried by the live rear axle 6.

7 and 8 are the drive shafts connecting respectively the differentials in the front and rear axles 4 and 5 to the main transmission of the tractor. Since the operation of this part of my tractor follows the usual practice and forms no part of my present invention the details of construction will not be further described.

9 is an angle bar secured to the frame 2 above the front axle 4 and extends transversely of the frame, constituting a cross bar in the frame.

10 and 11 are two draw bar rods which have their front ends extending freely through orifices at each side of the cross bar 9 and are held against withdrawal rearwardly by the nuts 12.

These draw bar rods 10 and 11 extend rearwardly of the tractor and are disposed obliquely of the frame, crossing each other intermediately of the length of the frame at "A."

They pass below the rear axle and are freely supported therefrom in hangers 13.

The rear ends of the draw bar rods are secured to an angle bar 14. The draw bar rods extend through orifices at each end of the angle bar, being secured by nuts 15.

This angle bar 14 thus constitutes a cross bar carried by the draw bar rods at the rear of the tractor.

The angle bar is provided with a series of spaced orifices 16 extending thereacross.

17 is the draft arm of a plow or other draft implement and its forward hooked end is adapted for engagement with any one of the orifices 16.

The hangers 13 comprise the split clamp portions $13^1$ adapted to engage the rear axle housing and to be secured thereon by the bolts $13^2$.

$13^3$ is the hanger proper and has a depending portion having the large orifice $13^4$ therein, through which the corresponding draw bar rod is adapted to freely extend.

The portion $13^3$ is secured in its operative position at the same time as the clamp 13¹, being inserted between the flanged clamp, and the same bolts 13² securing all parts rigidly together.

The construction and operation of my invention is as follows;

From the foregoing description taken in conjunction with the accompanying drawings it will be evident that the actual point of application of the draft pull upon the tractor resulting from the draft implements is located above the front axle and that the draw bar rods 10 and 11 pass rearwardly from this point below the rear axle.

Formerly the draft implements have been connected directly to the rear of the tractor frame, with the result that when in operation there is a marked tendency under heavy loads to lift the front wheels off the ground or to at least reduce the effective weight of the front wheels on the ground.

In the four wheel drive tractor this has naturally had the effect of very materially lessening the grip of the front wheels on the ground with a consequent reduction in the tractive effort of the tractor.

Also serious accidents have frequently resulted from the front wheels being lifted clear off the ground and the complete tractor turning turtle backwards.

Further this tendency to lift the front wheels off the ground naturally interferes very seriously with the steering of the tractor.

With my improved draft device this is not the case since under load there is a moment tending to force the front wheels downwardly thus increasing the tractive effort of the front wheels.

It is frequently necessary in many classes of work that the draft implements be offset laterally such as when plowing close up to trees when it is necessary that the plows be offset to one side of the tractor.

Formerly it has been difficult when doing this class of work to maintain the tractor traveling in a straight path since the pull of the draft implements being applied at one side of the tractor has had a tendency to skew the tractor into a course oblique to the direction of plowing.

It has been with a view of remedying this former trouble that I have devised my invention.

It has been demonstrated by the use of my device in actual practice that a greatly improved performance of the tractor is obtained in cases where the point of connection of the draft implements is offset laterally towards one side of the tractor, such as at C or D in Fig. 1, and that the tendency of the tractor to skew obliquely is very greatly reduced. Many modifications may be made in my invention without departing from the spirit of the same or the scope of the claims and therefore the forms shown are to be taken as illustrative only and not in a limiting sense.

For instance, while I have described and illustrated my invention as applied to a four wheel drive tractor and while the advantage as regards increasing the tractive effort of the front wheels is naturally only applicable to that type, it is to be understood that this improved draft arrangement would have marked advantages for a tractor having rear drive wheels only as the feature of overcoming the tendency to skew obliquely would be applicable to this type. Also as stated the tendency to turn turtle backwards is reduced and since the weight on the front wheels is not reduced by the draft pull, the steering is not interfered with.

Further, various other specific methods of securing the front ends of the draw bar rods above the front axle might be used in place of the cross bar 9.

From the foregoing it will be evident that I have devised valuable improvements in draft devices for tractors which will greatly increase the efficiency and general adaptability of these machines and will also reduce the likelihood of serious accidents.

What I claim as my invention is:

1. In a tractor the combination with the front and rear axles thereof, of a pair of draft rods secured above the front axle and at each side of the tractor, said rods extending obliquely rearwardly and passing below the rear axle and crossing each other intermediately of the length of the tractor, hangers carried by the rear axle and engaging the draft rods, and a draft connecting member carried by the rear ends of the draft rods.

2. In a tractor the combination with the front and rear axles thereof, of a pair of draft rods secured above the front axle and at each side of the tractor, said rods extending obliquely rearwardly and passing below the rear axle and crossing each other intermediately of the length of the tractor, hangers carried by the rear axle and engaging the draft rods, and a rigid cross bar connecting the rear ends of the draft rods.

3. In a tractor the combination with the front and rear axles thereof, of a pair of draft rods secured above the front axle and at each side of the tractor, said rods extending obliquely rearwardly and passing below the rear axle and crossing each other intermediately of the length of the tractor, hangers carried by the rear axle and engaging the draft rods and a rigid cross bar connecting the rear ends of the draft rods, said cross bar provided with a plurality of spaced orifices.

4. In a tractor the combination with the front and rear axles thereof, of a draft device comprising a pair of draft rods extending obliquely of the tractor and crossed intermediately of their length, the front ends of said rods secured to the tractor against withdrawal rearwardly above the front axle and the rods passing rearwardly below the rear axle and loosely supported therefrom, and a rigid cross bar connecting the rear ends of the rods.

5. In a tractor the combination with the front and rear axles thereof, of a draft device comprising a pair of draft rods extending obliquely of the tractor and crossed intermediately of their length, the front ends of said rods secured to the tractor against withdrawal rearwardly above the front axle and the rods passing rearwardly below the rear axle, a pair of hangers carried by the rear axle, the draft rods loosely supported in said hangers, a rigid cross bar connecting the rear ends of the rods, said cross bar provided with a plurality of spaced orifices extending thereacross.

6. In a tractor the combination with the front and rear axles thereof and the frame of the tractor, of a draft device comprising a pair of draft rods extending obliquely of the tractor and crossed intermediately of their length, a cross bar secured in the frame above the front axle, the front ends of said rods loosely engaging orifices in said cross bar and secured to said cross bar against withdrawal rearwardly at each side of the tractor, said rods extending rearwardly and passing below the rear axle, a pair of hangers carried by the rear axle, the draft rods loosely supported in said hangers, and a rigid cross bar connecting the rear ends of the rods, said cross bar provided with a plurality of spaced orifices extending thereacross.

THOMAS EDWARD McCOLLUM.

Witnesses:
 JOHN J. HAYWOOD,
 NORIEEN COLES.